J. H. WHITE.
Rice Pounder.
No. 81,042.
2 Sheets—Sheet 2.
Patented Aug. 11, 1868.
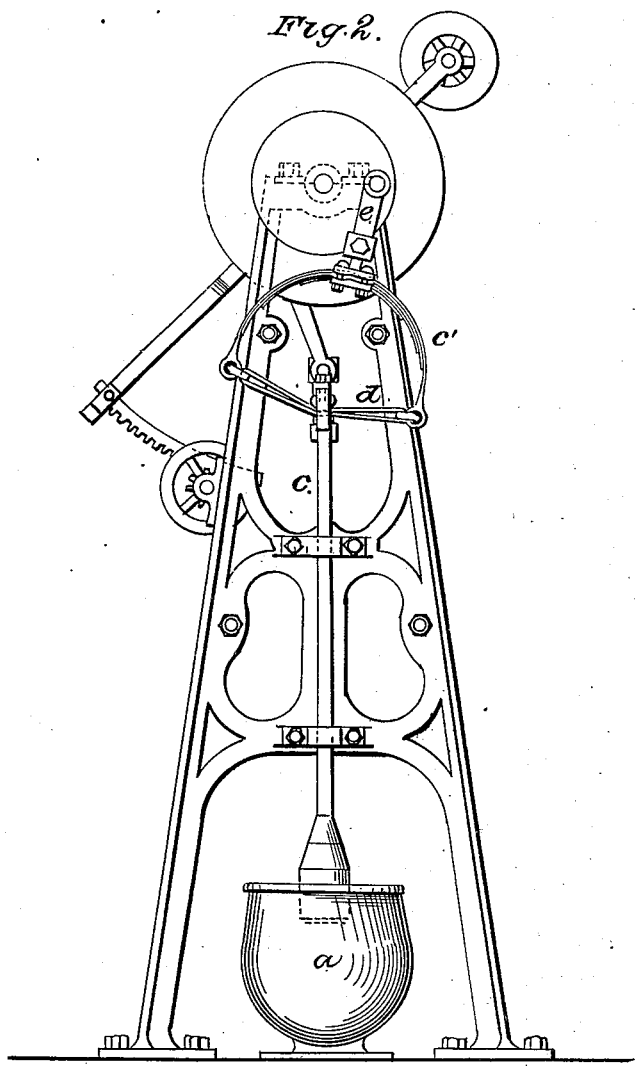

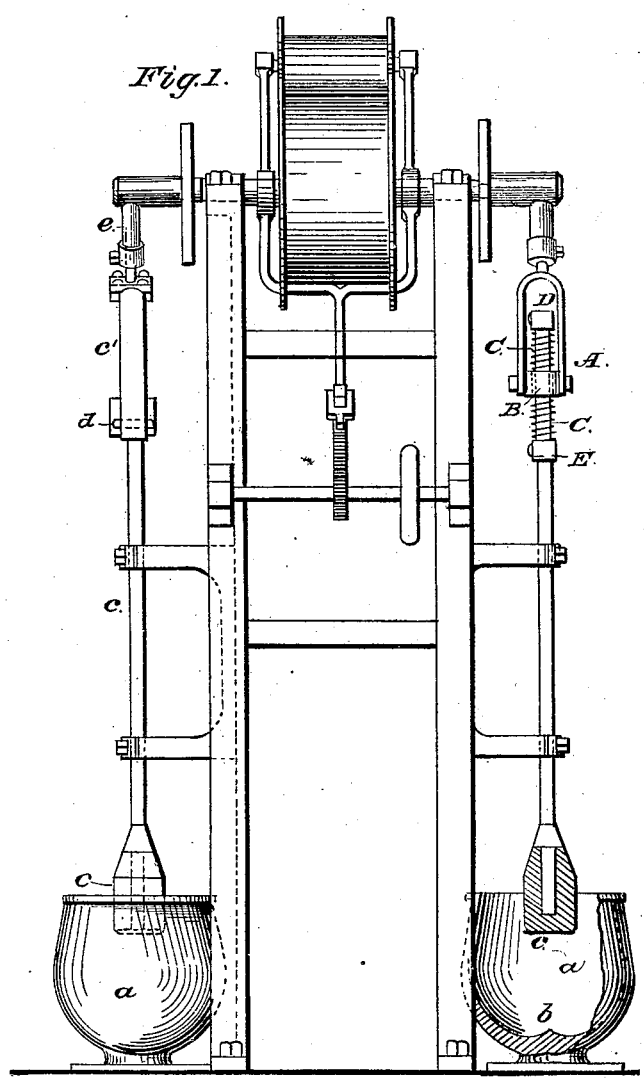

United States Patent Office.

JOHN H. WHITE, OF LIMA, PERU.

Letters Patent No. 81,042, dated August 11, 1868.

---

IMPROVED RICE-POUNDING MACHINE.

---

*The Schedule referred to in these Letters Patent and making part of the same.*

---

TO ALL WHOM IT MAY CONCERN:

Be it known that I, JOHN H. WHITE, of Lima, Peru, have invented a new and improved Rice-Pounding Machine; and I do hereby declare that the following is a full, clear, and exact description thereof, which will enable others skilled in the art to make and use the same, reference being had to the accompanying drawings, forming a part of this specification.

The present invention relates to a new and useful improvement in rice-pounding machines, whereby the rice may be whitened and cleaned by the use of spring-pounders striking the rice in rapid succession, and, from the peculiar shape of the mortars, which are raised to a point in their centres, will thus prevent the pestles from crushing the particles of rice, and at the same time cause them to spread from under the pestles, thereby causing the rice to be kept in constant motion, and rapidly agitated about in itself, thus whitening the rice in one-quarter of the time now occupied for the same purpose.

The construction and operation of my device will be understood from the following description, reference being had to the accompanying drawings, in which—

Figure 1, sheet 1, represents a front elevation, and

Figure 2, sheet 2, represents a side view of the same.

Similar letters of reference indicate corresponding parts.

The letters $a\ a$, in the accompanying drawings, represent the mortars, into which the rice to be whitened is placed. The bottoms of these mortars are raised to a point, $b$, in their centre, as shown in Sheet No. 1, so as to protect the rice from being crushed by the blow of the pestle $c$, and also for the purpose of spreading the rice, and causing it to shift and be agitated about in itself as the pestles fall.

The pestles $c$ are suspended in a similar manner to that of the power-hammer, patented by Thomas Shaw, dated February 27, 1866, No. 52,894, which consists in introducing a spring, $c'$, and belt $d$, between the pestles $c$ and connecting-rod $e$, so that a quick, lively blow may be obtained, so as to cause the rice to be rapidly shifted about in the mortars, and, from constantly being rubbed about in itself, will cause the rice to be made beautifully white, and, from the peculiar shape of the mortars, the flour from the rice will not gather so as to stick fast and clog the bottom, which has heretofore been a great source of annoyance in rice-mills.

In Sheet No. 1, A represents a modification of the spring $c'$, which consists in having the pestle-rod extending through a loose collar, B, with a spiral spring, C, on each side, pressing against the shoulders D E and the loose collar B, thus supporting the pestle between two springs, for the purpose of obtaining a sharp, lively, and rapid motion, making use of the rebound of the pestle through the springs $c\ c$.

Having thus described my invention, what I claim as new, and desire to secure by Letters Patent, is—

The mortars $a$, with bottoms $b$, in combination with the spring-pestles $c\ c$, operating in the manner and for the purpose substantially as shown and described.

The above specification of my invention signed by me, this 11th day of June, 1868.

JOHN H. WHITE.

Witnesses:
    ALEX. F. ROBERTS,
    J. M. COVINGTON.